UNITED STATES PATENT OFFICE.

CORNELIUS GODFREY, OF BROOKLYN, NEW YORK.

IMPROVEMENT IN EXTINGUISHING FIRE IN THE HOLDS OF SHIPS, VESSELS, &c.

Specification forming part of Letters Patent No. 36,515, dated September 23, 1862.

*To all whom it may concern:*

Be it known that I, CORNELIUS GODFREY, of the city of Brooklyn, county of Kings, and State of New York, have invented and reduced to practical use a new and useful method of effectually extinguishing fire in the holds of ships or other vessels that may occur by accident or spontaneous combustion, of which the following is a specification.

To enable others skilled in the art to make and use my invention, I will proceed to give the following description of its application.

I place in the hold of a vessel a pipe or pipes, (copper preferred,) reference being had to the size of vessel and the nature of the cargo. The pipes are perforated with holes or have small jets inserted in them, as the case may require. I then extend or conduct the pipe or pipes to the cook's room or galley, and there place stop valves or cocks in the pipes in any convenient place to be operated on when required. I then connect the valve or cock to a reservoir of steam, which may be generated by the use of a galley-stove, and in case of fire occurring in the hold or other parts of vessel, and, the valves or stop cocks being opened, the steam passes into the pipes and through the perforations or jets into the hold of the vessel, thereby expelling the oxygen and extinguishing the flames.

I do not claim simply the use of steam for extinguishing fire in the hold of ships, as I am well aware that this has heretofore been done by other arrangements or combinations than that which I propose; but

What I claim as my invention, and desire to secure by Letters Patent, is—

The application of a pipe or pipes with a jet or jets or perforations placed in the hold or other parts of a vessel in connection or combination with steam generated by or from the use of a galley-stove, for the purpose as set forth.

CORNLS. GODFREY.

Witnesses:
R. STURGIS,
JOSEPH T. MARTIN.